DATA STORAGE SYSTEM WITH SELECTIVE READOUT

Filed April 8, 1960

INVENTOR
JOHN R. SCANTLIN
BY HIS ATTORNEYS
HARRIS, KIECH, RUSSELL & KERN

United States Patent Office 3,159,818

Patented Dec. 1, 1964

3,159,818

DATA STORAGE SYSTEM WITH SELECTIVE READOUT

John R. Scantlin, Los Angeles, Calif., assignor to Scantlin Electronics, Inc., Los Angeles, Calif., a corporation of Delaware Filed Apr. 8, 1960, Ser. No. 20,965

12 Claims. (Cl. 340—172.5)

This invention relates to data storage and retrieval systems and, in particular, to systems wherein data can be stored continuously or as received and wherein particular data can be read out as desired without disturbing the incoming data. The invention is described herein as applied to the daily reports of stock exchange transactions but is equally applicable wherever information is available continuously and it is desirable to recall particular data rapidly, such as with sports events resutls and business records.

In general, the invention contemplates a storage unit with a continuously available input, an interrogation source, means for scanning all the stored data looking for coincidence between the sought-after data and the stored data, and means for transmitting the coinciding stored data to an output device. Ordinarily the output device will be a printing or recording unit for visual inspection, but also may be a sound system producing an audible output or an electrical system such as a telephone or Teletype line or another storage unit of some type.

It is an object of the invention to provide a data storage system having means for recording data continuously and means for scanning the recorded data on command while continuing to record. A further object is to provide storage capacity for a large quantity of data, such as a full day's output of a stock market ticker and to provide for scanning of all of the data in a very short time, such as in a few seconds. A further object is to provide such a system which utilizes an endless tape with the data written into the tape in a forward direction at a relatively low speed and with the stored data read from the tape in the reverse direction at a relatively high speed, with substantially the entire tape available for reading at any time without disturbing the writing operation.

It is an object of the invention to provide a data storage system including means for continuously comparing an inquiry identifying code with the data read from storage and means for terminating the comparison when coincidence occurs and transmitting the coinciding data to an output device. A further object is to provide such a system wherein the read data is directed through a small storage unit with the most recently read data being compared with the inquiry and transmitted to the output device. Another object is to provide such a system wherein the incoming data is written in a forward sequence with the data being read from the main storage unit into the secondary storage unit in the reverse sequence and then is transmitted from the secondary storage unit to the output device in the forward sequence. Another object is to provide such a system wherein the secondary storage unit is a shift register of a capacity to hold at least one complete piece of data with the data being read from the main storage unit into the shift register in the reverse direction and with the particular sought-after data being transmitted from the shift register to the output device in the forward direction. A still further object is to provide such a system wherein the shift register may also function as a counter during the data transmission phase with the counter operating in conjunction with a printer or recorder to convert the binary data into alphanumeric characters.

It is an object of the invention to provide a data storage system that can be interrogated from any one of a plurality of remote stations. A further object is to provide such a system which requires only a single storage, write, read and coincidence unit, with each remote station including means for generating the identifying code of the particular data sought, means for initiating operation of the storage scan and a recorder or other output device for utilizing the data when located. A further object is to provide such a system wherein the writing of incoming data into the storage unit is automatic and continuous and independent of the remote station.

It is an object of the invention to provide a data storage system having a storage unit, write means for writing data into the storage unit, read means for reading data from the storage unit while the write means is writing, a coincidence circuit for comparing the data read from the storage unit with an inquiry to identify particular data, means for coupling the read means to the coincidence circuit, and an output device for recording the particular data separately from the other data read by the read means.

It is an object of the invention to provide a data storage system having a storage unit with a forward direction and a reverse direction and a relatively large storage capacity, a write unit for writing data into the storage unit, a read unit for reading data from the storage unit, first means for driving the storage unit past the write unit in the forward direction second means for driving the storage unit past the read unit in the forward and reverse directions, a shift register having a relatively small storage capacity, means for coupling the read unit to the shift register when the second drive means is operating in the reverse direction for continuously storing the latest portion of the data read from the storage unit, a coincidence circuit for comparing the data in the shift register with an inquiry to identify particular data, and means for transmitting such particular data from the shift register.

It is an object of the invention to provide a data storage system having a storage unit, means for storing pieces of data seriatim in the storage unit with each piece of data having an identifying code, means for reading stored data from the storage unit, means for continuously comparinng a preselected code with the identifying code of the data read from the storage unit, means for stopping the comparison when a stored data code coincides with the preselected code, and means for transmitting the piece of data with the coinciding code to an output device.

In a specific embodiment of the present invention, the information from the conventional stock market ticker is converted to binary form and written onto an endless magnetic tape as the information is received. The tape will handle a full day's transactions. The remote station is operated by any person desiring stock market transaction information. The remote station includes a keyboard, a dial, or a similar device for transmitting the identifying letters of a particular stock to the centrally located storage unit. The operator also indicates whether he desires merely the last price of the particular stock or a survey of the day's transactions in the stock. If only the last price is desired, the apparatus will search the information on the tape for the most recent transaction and will print out at the remote station a complete record of the last transaction of the particular stock in the same form as it appeared on the ticker tape. If a survey or the day's activities is desired, the apparatus will scan all the information stored in the tape and print out a transaction for approximately every quarter hour of the day's record from the ticker tape.

The invention also comprises novel details of construction and novel combinations and arrangements of components, which will more fully appear in the course of the following description. The drawing merely shows and the description merely describes preferred embodiments of the present invention which are given by way of illustration or example.

Figures 1, 2:
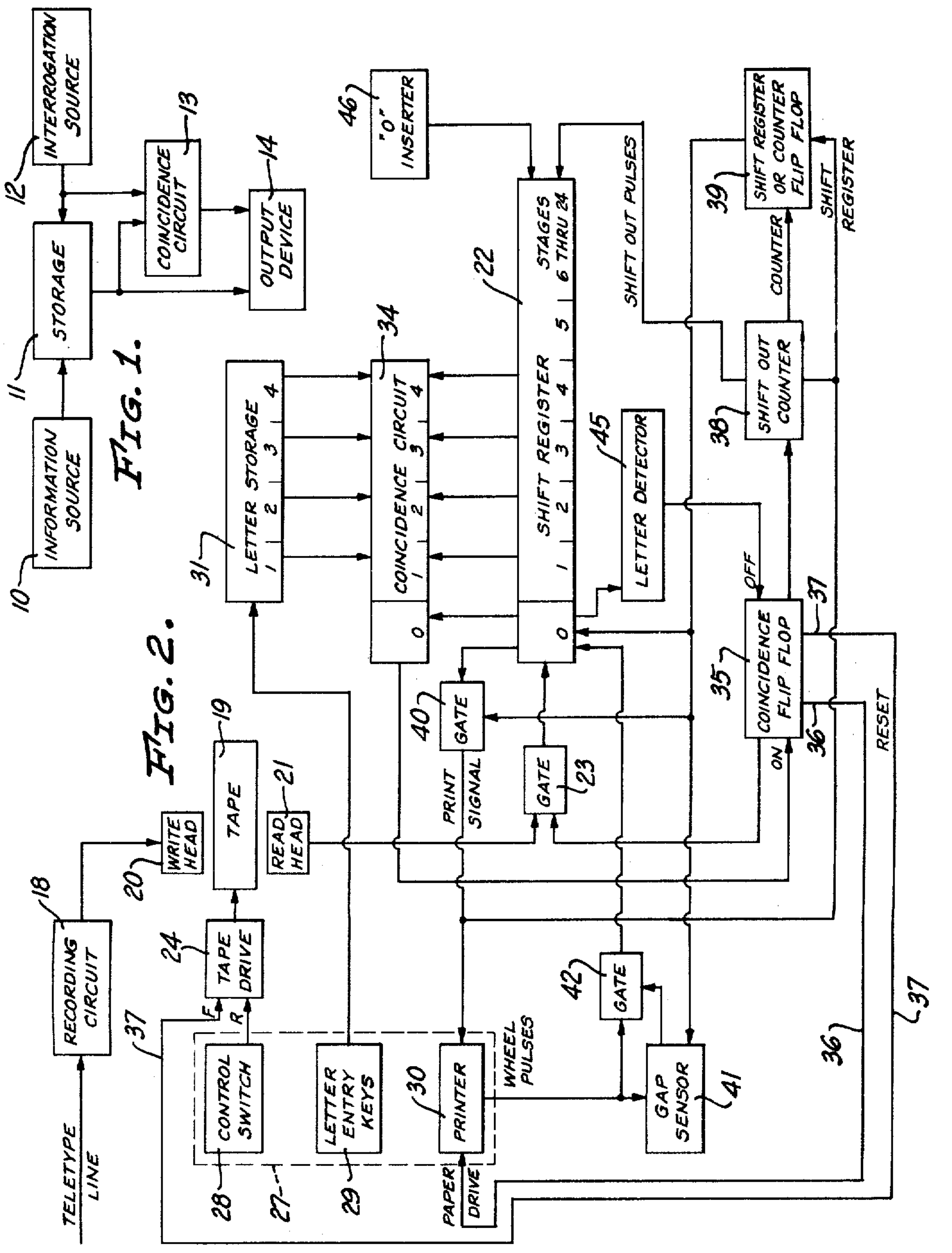
FIG. 1 is a block diagram illustrating a preferred form of the invention.
FIG. 2 is a diagram of a specified apparatus.

The apparatus of FIG. 1 includes an information source 10, a storage unit 11, an interrogation source 12, a coincidence circuit 13, an an output device 14. The information source 10 may utilize the conventional stock market ticker line, converting the electrical signals to a suitable form for writing into the storage or memory unit 11. The storage unit 11 may be any conventional type of memory device; however, an endless magnetic tape is particularly suited for the present application. The incoming data from the stock market ticker line is written into the storage unit in the same form and order as received. The tape should be of a length to contain at one time the entire day's transactions. In the following description, a complete stock transaction record will be referred to as a piece of data which will include one or more letters comprising the identifying code of the stock and, hence, of the piece of data and a series of numbers and symbols indicating the number of shares traded and the selling price or the bid and ask figures.

The interrogation source 12 is actuated by the operator who is seeking information on stock transactions. The interrogation source may be a keyboard or a telephone dial or the like which generates electrical signals corresponding to the identifying code letters of a particular stock. When the operator generates the identifying code in the interrogation source, this identifying code is stored in the coincidence circuit 13 and the stored information in the storage unit is scanned by a reading device with the read information also directed to the coincidence circuit. When a piece of data having the identifying code sought by the operator is read from the storage unit into the coincidence circuit, the coincidence circuit generates a signal indicating that the particular stock has been located and then the entire piece of data is transmitted to the output device 14. The output device ordinarily is a recording instrument which prints the letters, numbers and symbols in the same form as they appear on the ticker tape.

A specific embodiment of the data storage system of the invention is shown in greater detail in FIG. 2. The stock market information is connected to a recording circuit 18 through a Teletype line. The recording circuit converts the incoming signals into appropriate form for storage on an endless magnetic tape 19 through a write head 20. The tape is continuously driven past the write head in a forward direction at a relatively low rate so that the entire day's transaction will be stored on the tape in the same sequence as it arrives on the ticker line. A read head 21 is positioned adjacent the write head 20 for reading data from the tape to a shift register 22 through a gate 23. A separate tape drive 24 drives the tape past the read head in both the forward and reverse directions, the drive normally operating in the forward direction to maintain a minimum amount of tape and, hence, stored information, between the write head and read head. While various types of storage units other than magnetic tape, and various types of tape and tape drives may be used in the present invention, a preferred form for the tape and tape drive is shown in my copending application entitled Tape Handling System, Serial No. 20,942, filed concurrently with this application.

The system may utilize a large number of operators' stations 27, one of which is shown in FIG. 2. Data is obtained from the storage system by use of an operator's station and the present apparatus permits a large number number of individuals to be serviced from a single storage unit. As an entire day's record can be searched in merely a few seconds, it is practical to supply dozens of stations with a single storage tape. The operator station 27 includes a control switch 28, letter entry keys 29, and a printer 30 which serves as the output device. When an operator desires to learn the last price of a particular stock, he actuates the appropriate letter entry keys to enter the identifying code letters of the particular stock into a letter storage 31. In this particular embodiment, the letter storage 31 provides four stages for storage of four characters. As some stocks have only one, two or three letter codes, the unfilled stages produce binary zeros, indicating that a number should be present in the data sequence.

After the identifying code has been entered in the letter storage, the control switch 28 is actuated to operate the tape drive 24 in the reverse direction for driving the tape past the read head with the stored information being read out in reverse sequence. In the particular embodiment disclosed herein, a magnetic tape 380 feet in length is utilized, with the tape being driven past the write head at a continuous rate of 0.22 inch per second. The tape is driven past the read head 21 by the tape drive 24 at a rate of 120 inches per second providing 33,000 bits per second. This high rate for reading permits the entire tape to be scanned in a few seconds. The gate 23 is normally in the open or on condition so that information read from the tape is continuously fed into the shift register 22 with the information being discarded after passing through all stages of the shift register. Referring to the diagram of FIG. 2, movement of information through the shift register to the right is referred to as movement in the reverse direction since the data is in the reverse sequence. The number of stages in the shift register is dependent upon the maximum length of pieces of data to be handled. In the particular embodiment shown herein, twenty-four stages are provided for handling pieces of data with a maximum of twenty-four characters.

A coincidence circuit 24 provides a coincidence signal to a coincidence flip-flop 35 when there is coincidence between the letter codes of the two inputs to the coincidence circuit, the inputs comprising the letter storage 31 and the first five stages of the shift register 22. Stage zero of the coincidence circuit 34 serves to identify the first letter of a sequence. The first letter of a sequence is always preceded by a number which is the last symbol of the preceding sequence. Hence, letter code coincidence in stages 1 et seq. can be achieved only when there is a number in stage zero. Letters are easily distinguished from numbers by having the last bit of the six-bit symbol code a zero for letters and a one for numbers.

The coincidence flip-flop 35 is normally in the off condition and is changed to the on condition by the signals from the coincidence circuit. Actuation of the coincidence flip-flop changes the system from one which is searching for particular data to one which transmits this particular data to an output device. When in the on condition, the coincidence flip-flop closes the gate 23 blocking data flow from the read head to the shift register 22. Also, the printer 30 is energized through line 36 and the tape drive 24 is shifted to the forward direction through reset line 37 to run the tape back to its normal position for the next inquiry. The coincidence flip-flop also actuates a shift out counter 38 causing the shift register to advance one character in the forward direction, moving the first character of the identifying code of the particular data sought from stage one to stage zero of the shift register. The particular apparatus described herein utilizes a six-bit code for each character so that the shift out counter 38 generates a string of six shift pulse to shift the register forward one character. The system is now ready for transmitting the particular data to an output device, the data being stored in the shift register and available for use by any conventional means.

A particular type of output system is shown in conjunction with the apparatus of FIG. 2 wherein the shift register is also used as a counter in conjunction with the printer 30 in the station 27. Various types of recording devices can be used, a preferred form being shown in my copending application entitled Printer, Serial No. 20,960, now Patent No. 3,064,545, filed concurrently with the present application.

After completing a one character forward shift in the shift register, the shift out counter 38 causes a change of the flip-flop 39 to the counter state. When in the counter state, the flip-flop 39 opens a gate 40, energizes a gap sensor 41 and changes the zero stage of the shift register 22 to a counter.

The printer 30 has a continuously rotating wheel which generates a train of pulses corresponding to characters carried on the wheel with a gap in the pulse train indicating the origin of the train. The train of wheel pulses is coupled to the gap sensor 41 and to a gate 42 which is normally closed. When the gap sensor 41 is energized from the flip-flop 39, the next gap in the train of pulses will be sensed and the gate 42 will be changed to the open condition. The zero stage of the shift register has a preset count corresponding to the particular character stored therein. The zero stage functioning as a counter counts the incoming pulses of the train from the printer wheel and, when a full count is reached, generates a print signal which is coupled through the gate 40 to the printer 30. The pulse train on the printer wheel is synchronized with the printing characters of the printer so that the particular character stored in stage zero of the shift register is printed. With a six-bit binary code, a stage of the shift register will count to sixty-four permitting a maximum of sixty-four characters in the data being handled. A count down sequence could be used in place of the count up sequence described above. Also, a counter separate from the shift register could be utilized with the printer if desired; however, the particular apparatus described herein permits a plurality of operations to be carried out with a single circuit resulting in a reduction in cost and size of the equipment.

The print signal from the counter is also connected to the shift out counter 38 and the flip-flop 39. The print signal converts the flip-flop to the shift register state, closing the gate 40, de-energizing the gap sensor 41, and switching the zero stage of the shift register back to shift register operation. The print signal actuates the shift out counter to cause the shift register to shift another character in the forward direction bringing the second character of the particular data sought to the zero stage of the shift register. Then the counting and printing cycle described above is repeated after which the shift register is again shifted one character in the forward direction. This cycle of operation continues until the complete piece of data has been printed. In the particular device described herein, the printing rate is ten characters per second.

After the complete piece of data has been transmitted out of the shift register to the printer, the coincidence flip-flop 35 is switched to the off condition, restoring the system to the normal status ready for another inquiry. The particular shift register of FIG. 2 will store a twenty-four-character piece of data and after the entire twenty-four characters have been shifted out, the coincidence flip-flip can be switched to the off state. However, since stock market ticker information often utilizes considerably less than twenty characters per piece of data, a letter detector 45 is provided for changing the coincidence flip-flop 35 to the off state when the complete piece of data has been read out from the shift register. A piece of data on the stock market ticker always comprises a series of letters followed by a series of numbers and symbols so that a letter following a series of numbers and symbols indicates the arrival of a new piece of data. The letter detector 45 determines when a letter is shifted into the zero stage and changes the flip-flop 35 to the off condition. The letter detector is deactivated during the first four characters of the printing out cycle so that the identifying code of the particular data can be printed.

The zero inserter 46 enters binary zeros into the last stage of the shift register 22 as information is shifted out for printing. Hence, the letter detector will operate when the last symbol is shifted out the register although the particular data sequence was longer than the shift register storage capacity and the initial letter of the next sequence is not available.

If desired, the apparatus of FIG. 2 can be used to provide a survey of the entire day's activities of a particular stock. When a survey is desired, the reset line 37 from the coincidence flip-flop 35 to the tape drive 24 is left open. Then when coincidence is indicated by the coincidence circuit 34, changing the coincidence flip-flop 35 to the on state and closing the gate 23, the tape drive 24 continues to drive the tape past the read head 21 in the reverse direction. After the particular data stored in the shift register is transmitted to the printer, the coincidence flip-flop is switched to the off state thereby opening the gate 23. As the tape drive 24 is still running in the reverse direction, data is again fed into the shift register in the usual manner. The coincidence circuit again indicates coincidence when another transaction of the same stock is read into the shift register, after which this transaction is transmitted to the printer for recording immediately following the previous transaction. This cycle of search and record is repeated continuously until the beginning of the day's record on the tape is reached, at which time the entire system is reset to drive the tape in the forward direction and restore the components to their normal condition. Preferably, a signal is automatically written on the tape at the beginning of each day, which signal will stop the tape after it has been scanned back to the beginning of information recorded that day. With the particular tape speeds and printing rates referred to above, the survey provides a record of a transaction about every quarter hour during a day. In the commercial version of the stock market data recording system, the operator station includes a switch for selecting either the last price of a particular stock or a survey of the day's activities in the particular stock.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In a data storage system, the combination of: a storage unit; write means for writing data into said storage unit seriatim as received without a predetermined address; read means for reading said data from said storage unit while said write means is writing; a coincidence circuit for comparing the data read from said storage unit with a complete inquiry at one time to identify particular data; means for coupling said read means to said coincidence circuit; and an output device for recording said particular data separately from the other data read by said read means.

2. In a data storage system, the combination of: a storage unit; write means for writing data into said storage unit continuously and in a forward sequence; read means for reading said data from said storage unit in a reverse sequence while said write means is writing; a shift register; means for coupling said read means to said shift register for storage in the reverse sequence of the latter portion of the data read from said storage unit; a coincidence circuit for comparing the data in said shift register with an inquiry to identify particular data; an output device; and means for coupling said shift register to said output device for transmitting said particular data in the forward sequence to said output device.

3. In a data storage system, the combination of: a storage unit; write means for writing data into said storage unit in a forward sequence; read means for reading said data from said storage unit in reverse sequence; a shift register operable in forward and reverse directions; means for coupling said read means to said shift register for transmittal of the read data therethrough in the reverse direction and storage of the latest read portion of the data therein; a coincidence circuit for continuously comparing the data in said shift register with an inquiry to identify particular data; an output device; and means for coupling said shift register to said output device for transmitting said particular data from said shift register to said output device in the forward direction and in the forward sequence.

4. In a data storage system, the combination of: a storage unit; write means for writing data into said storage unit continuously; read means for reading said data from said storage unit while said write means is writing; a shift register; first switch means having an on position for coupling said read means to said shift register for storage of the latter portion of the data read from said storage unit, and an off position for disconnecting said read means from said shift register; a coincidence circuit for continuously comparing the data in said shift register with an inquiry to identify particular data; an output device; second switch means having an on position for coupling said shift register to said output device for transmitting said particular data to said output device, and an off position for disconnecting said shift register from said output device; and a coincidence control circuit actuated by said coincidence circuit for changing said first switch means to said off position and said second switch means to said on position when coincidence exists and changing said first switch means to said on position and said second switch means to said off position when said particular data has been transmitted to said output device.

5. In a data storage system, the combination of: a storage unit having a forward direction and a reverse direction and having a relatively large storage capacity; a write unit for writing data into said storage unit; a read unit for reading data from said storage unit; first means for driving said storage unit past said write unit in the forward direction; second means for driving said storage unit past said read unit in the forward and reverse directions; a shift register having a relatively small storage capacity; means for coupling said read unit to said shift register when said second drive means is operating in the reverse direction for continuously storing in said shift register the latest portion of the data read from said storage unit; a coincidence circuit for comparing the data in said shift register with an inquiry to identify particular data; and means for transmitting said particular data from said shift register.

6. In a data storage system, the combination of: a storage unit having a forward direction and a reverse direction and having a relatively large storage capacity; a write unit for writing data into said storage unit; a read unit for reading data from said storage unit; first means for driving said storage unit past said write unit in the forward direction; second means for driving said storage unit past said read unit in the forward and reverse directions; a shift register having a relatively small storage capacity; means for coupling said read unit to said shift register when said second drive means is operating in the reverse direction for continuously storing the latest portion of the data read from said storage unit; a coincidence circuit for comparing the data in said shift register with an inquiry to identify particular data; a recorder for recording data in discrete characters, said recorder generating a pulse train corresponding to characters moved to a recording position; a counting unit having said recorder pulse train and said particular data from said shift register as inputs and generating a record signal when the recorder character corresponding to the data input is in the recording position; and means for coupling said record signal to said recorder in controlling relation.

7. In a data storage system, the combination of: a storage unit having a forward direction and a reverse direction and having a relatively large storage capacity; a write unit for writing data into said storage unit; a read unit for reading data from said storage unit; first means for driving said storage unit past said write unit in the forward direction; second means for driving said storage unit past said read unit in the forward and reverse directions; a shift register having a relatively small storage capacity; means for coupling said read unit to said shift register when said second drive means is operating in the reverse direction for continuously storing the latest portion of the data read from said storage unit; a coincidence circuit for comparing the data in said shift register with an inquiry to identify particular data; a recorder for recording data in discrete characters, said recorder generating a pulse train corresponding to characters moved to a recording position, with the particular data character to be recorded stored in the initial stage of said shift register and with said initial stage operable as a shift register and as a counter; means for switching said initial stage from shift register to counting condition when a character to be recorded is shifted into said initial stage and switching from counting to shift register condition after such character has been recorded, for shifting the next character into said initial stage, said initial stage counter generating a record signal when the recorder character corresponding to the character stored in the initial stage is in the recording position; and means for coupling said record signal to said recorder in controlling relation.

8. In a data storage system, the combination of: an endless tape having a forward direction and a reverse direction and having a relatively large storage capacity; a write unit for writing data into said tape seriatim as received without a predetermined address; a read unit for reading data from said tape; first drive means for driving said tape past said write unit in the forward direction at a relatively low, continuous rate; second means for driving said tape past said read unit in the forward and reverse directions on command at a relatively high rate; a shift register having a relatively small storage capacity; means for coupling said read unit to said shift register when said second drive means is operating in the reverse direction for continuously storing the latest portion of the data read from said tape; an inquiry storage unit for storing the identifying code of particular data; a coincidence circuit for comparing said shift register contents with said storage unit contents to identify particular data; means for disconnecting said read unit from said shift register when coincidence is achieved in said coincidence circuit; and means for transmitting said particular data from said shift register.

9. In a data storage system, the combination of: an endless tape having a forward direction and a reverse direction and having a relatively large storage capacity; a write unit for writing data into said tape; a read unit for reading data from said tape; first drive means for driving said tape past said write unit in the forward direction at a relatively low, continuous rate; second means for driving said tape past said read unit in the forward and reverse directions on command at a relatively high rate; a shift register having a relatively small storage capacity; means for coupling said read unit to said shift register when said second drive means is operating in the reverse direction for continuously storing the latest portion of the data read from said tape; an inquiry storage unit for storing the identifying code of particular data; a coincidence circuit for comparing said shift register contents with said storage unit contents to identify particular data; means for disconnecting said read unit from said shift register when coincidence is achieved in said coincidence circuit; means for transmitting said particular data from said shift register to a recorder; and a plurality of control units, with each of said control units coupled to said second drive means, said inquiry storage unit and said transmitting means, and including: means for generating the identifyfing code of particular data for entering into said inquiry storage unit; a recorder for recording the particular data from said transmitting means; and means for generating a command signal for actuating said second drive means in the reverse direction.

10. In a data storage system, with each piece of data including an identifying code and an information section, the combination of: an endless tape having a forward direction and a reverse direction and having a relatively large storage capacity; a write unit for writing the identification code and information section of data into said tape seriatim as received without a predetermined address; a read unit for reading data from said tape; first means for driving said tape past said write unit in the forward direction at a relatively low continuous rate; second drive means for driving said tape past said read unit in the forward and reverse directions on command and at a relatively high rate; a shift register operable in forward and reverse directions and having a relatively small storage capacity; first switch means having an on position for connecting said read unit to said shift register when said second drive means is operating in the reverse direction for continuously storing in said shift register in the reverse direction, the latest portion of the data read from said tape, and an off position for disconnecting said read unit from said shift register; an inquiry storage unit for storing the identifying code of a particular piece of data; a coincide circuit for comparing the input portion of said shift register contents with said storage unit contents to identify a particular piece of data; an output device; means for transmitting data from said shift register in the forward diretcion to said output device; second switch means having an on position for connecting said shift register to said transmitting means and an off position for disconnecting said shift register from said transmitting means; and control means for moving said first switch means to the off position and said second switch means to the on position when coincidence exists in said coincidence circuit, and moving said first switch means to the on position and said second switch means to the off position when a complete piece of data is transmitted to said output device and the identifying code of the next piece is shifted into the input portion of said shift register.

11. In a data storage system, the combination of: a storage unit; means for storing pieces of data seriatim in said storage unit, with each stored piece of data having an identifying code incorporated therein; means for reading stored data from said storage unit into a shift register which will retain at least one complete piece of data at one time; means for continuously comparing a preselected code with the data in said shift register; means for stopping said comparison when the identifying code of read data coincides with the preselected code; and means for reversing direction of said shift register and transmitting the piece of data with the coinciding code from said shift register to an output device.

12. In a securities price record system, with each piece of security price data having a first security identification section and a second price section, the combination of:

an endless tape having a forward direction and a reverse direction and having a relatively large storage capacity;

a write unit for writing the first and second sections of each piece of data into said tape in random order as received and without an address;

a read unit for reading data from said tape;

first means for driving said tape past said write unit in the forward direction at a relatively low continuous rate;

second drive means for driving said tape past said read unit in the forward and reverse directions on command and at a relatively high rate;

a shift register operable in forward and reverse directions and having a relatively small storage capacity for storing at least one complete piece of security price data;

means for connecting said read unit to said shift register when said second drive means is operating in the reverse direction for continuously inserting the data read from said tape in reverse sequence into said shaft register in the reverse direction;

an inquiry storage unit for storing the security identification section of a desired piece of data;

a coincidence circuit for continuously comparing the input portion of said shift register contents with the security identification in said storage unit as the data read from said tape passes through said shift register to identify the desired piece of data;

an output device;

means for transmitting data from said shift register in the forward sequence and in the forward direction to said output device; and means for connecting said shift register to said transmitting means when coincidence exists in said coincidence circuit for transmitting the piece of security price data in said shift register to said output device in the forward sequence.

References Cited in the file of this patent

UNITED STATES PATENTS

| | | |
|---|---|---|
| 2,668,875 | Shepherd | Feb. 9, 1954 |
| 2,782,398 | West | Feb. 19, 1957 |
| 2,885,659 | Spielberg | May 5, 1959 |
| 2,951,232 | Amdahl | Aug. 30, 1960 |

UNITED STATES PATENT OFFICE
CERTIFICATE OF CORRECTION

Patent No. 3,159,818 December 1, 1964

John R. Scantlin

It is hereby certified that error appears in the above numbered patent requiring correction and that the said Letters Patent should read as corrected below.

Column 1, line 17, for "resutls" read -- results --; column 2, lines 43 and 44, for "comparinng" read -- comparing --; column 3, line 8, for "specified" read -- specific --; line 11, for "an", first occurrence, read -- and --; line 74, strike out "number"; column 4, line 38, for "24" read -- 34 --; line 69, for "pulse" read -- pulses --; column 6, line 6, after "out" insert -- of --; column 9, line 3, for "identifyfing" read -- identifying --; lines 12 and 13, for "identification" read -- identifying --; same column 9, line 30, for "coincide" read -- coincidence --.

Signed and sealed this 27th day of April 1965.

SEAL)
Attest:

ERNEST W. SWIDER
Attesting Officer

EDWARD J. BRENNER
Commissioner of Patents